United States Patent [19]
Gallo

[11] Patent Number: 5,718,310
[45] Date of Patent: Feb. 17, 1998

[54] CORD WINDER

[75] Inventor: Bruce Gallo, Sparta, N.J.

[73] Assignee: Dynatec International, Inc., Salt Lake City, Utah

[21] Appl. No.: 699,437

[22] Filed: Aug. 19, 1996

[51] Int. Cl.⁶ .................... H04M 1/00; H02G 11/02
[52] U.S. Cl. .................... 191/12.2 R; 379/438
[58] Field of Search .................... 191/12 R, 12.2 R, 191/12.4; 379/438, 451

[56] References Cited

U.S. PATENT DOCUMENTS

| | | | |
|---|---|---|---|
| 2,031,434 | 2/1936 | Stem et al. | 379/438 X |
| 2,211,561 | 8/1940 | Flannelly | 191/12.2 R |
| 4,141,438 | 2/1979 | Diem | 191/12.2 R X |
| 5,117,456 | 5/1992 | Aurness et al. | 379/451 X |
| 5,156,242 | 10/1992 | Ditzig | 191/12.2 R |
| 5,241,593 | 8/1993 | Wagner | 191/12.4 X |
| 5,481,607 | 1/1996 | Hsiao | 379/438 |

Primary Examiner—Karen B. Merritt
Assistant Examiner—Scott L. Lowe
Attorney, Agent, or Firm—Plante & Strauss

[57] ABSTRACT

There is disclosed a telephone cord winder having a single, torsional spring driven cord reel which is rotationally mounted within a cord winder housing. The extendible telephone cord is wound on the reel and electrically connected, through an internal rotary connector, to a stationary cord. Each of the extendible and stationary cords terminates in a modular phone plug adapted to be received in conventional modular phone sockets with multiple contacts, conventionally four or six contacts for phones.

12 Claims, 5 Drawing Sheets

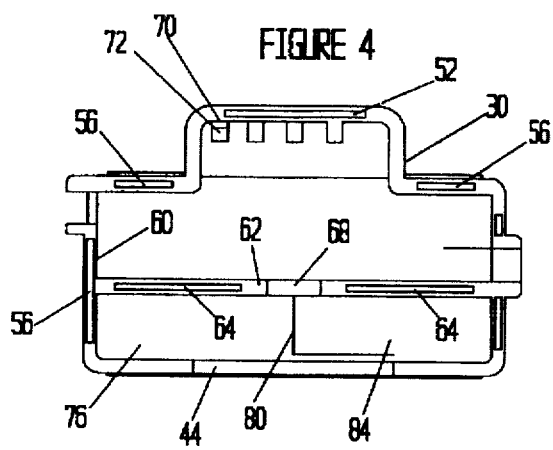
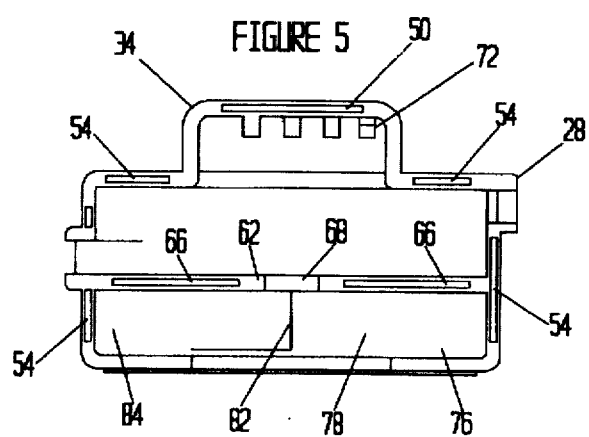
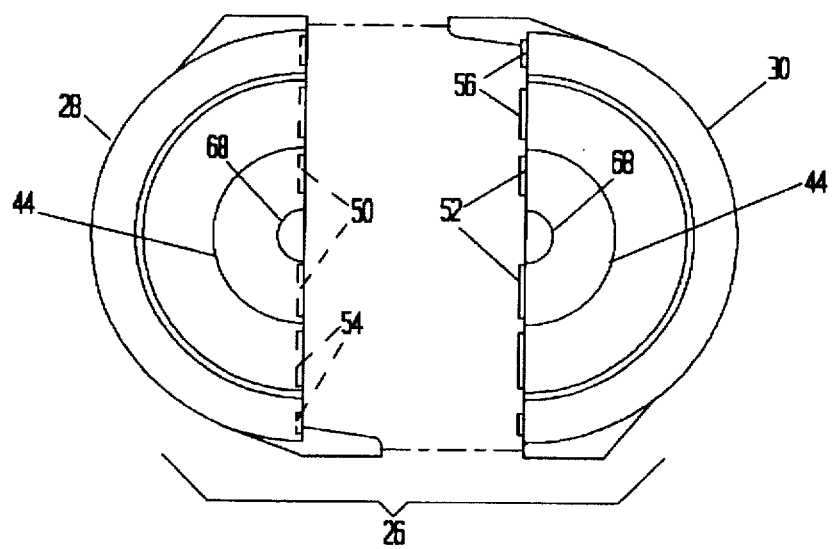

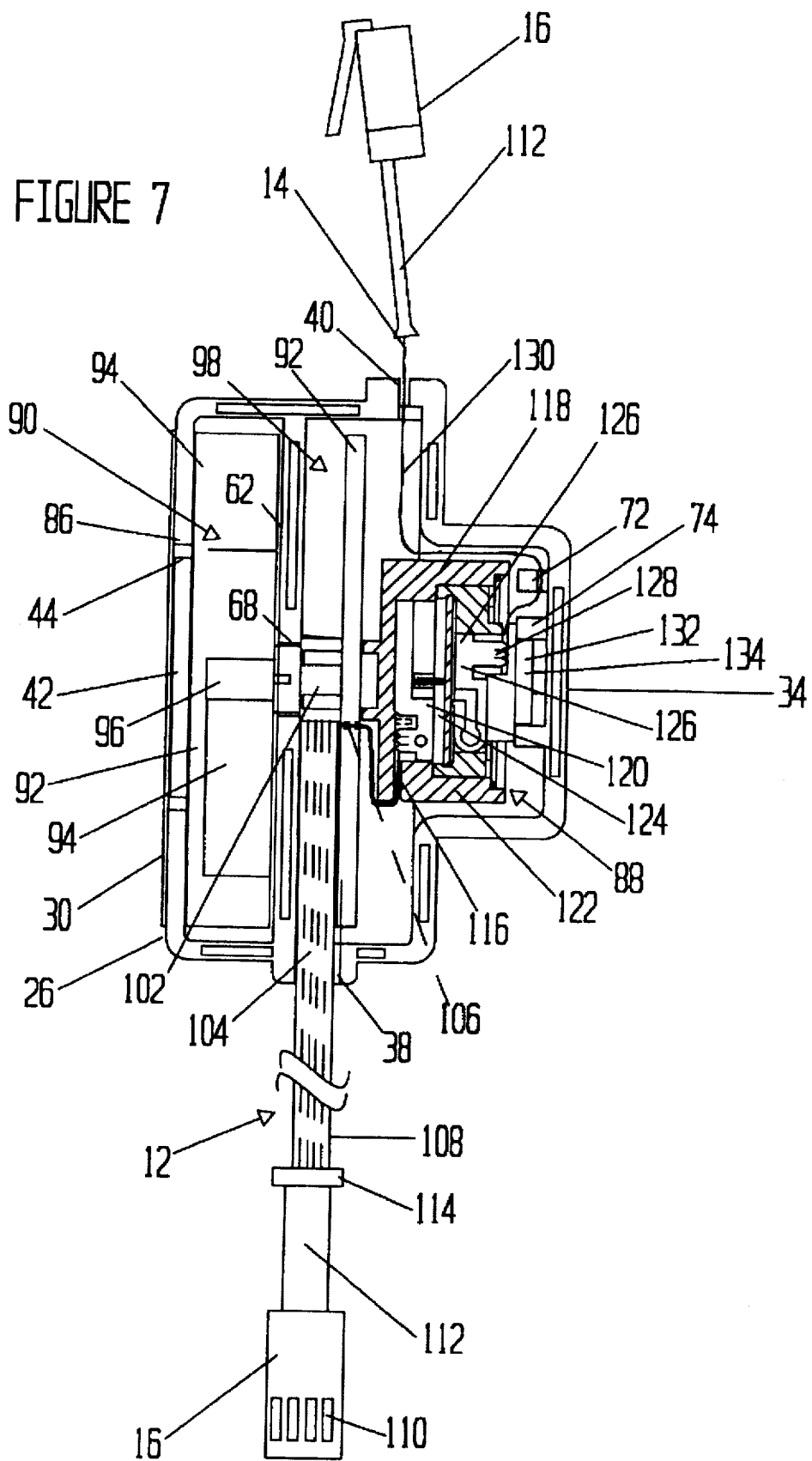

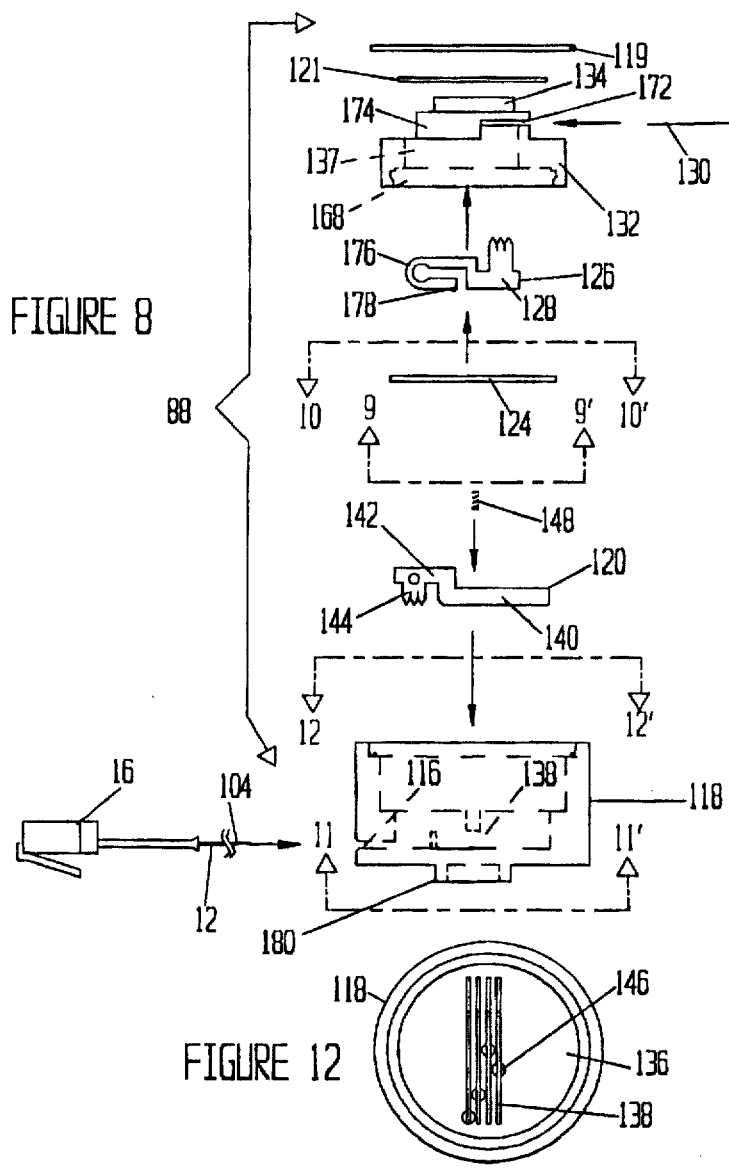

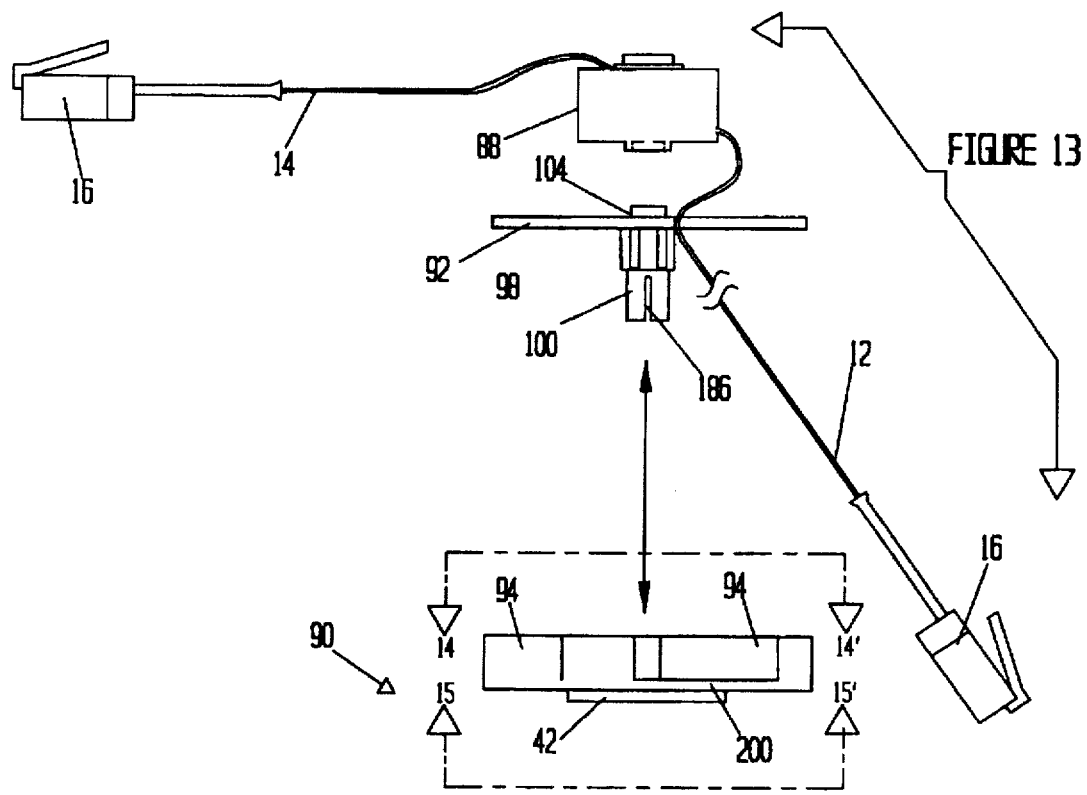
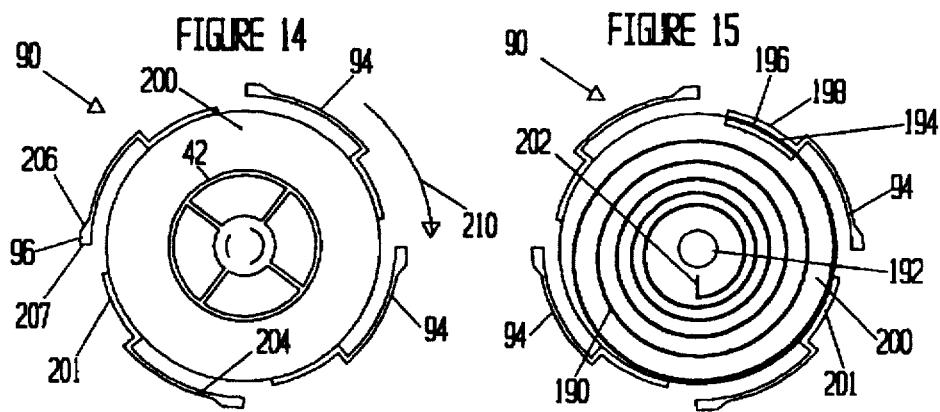

CORD WINDER

BACKGROUND OF THE INVENTION

1. Field of Invention

This invention relates to a cord winder and, in particular, to a cord winder suitable for telephone cords.

2. Brief Statement of the Prior Art

Various mechanisms and equipment have been proposed to eliminate tangling of telephone cords and the like. Coiled cords are commonly used, however, these cords lose resiliency after prolonged use and fail to retract into compact coils. Even when coiled, the cord can still become entangled with other cords such as computer cords, keyboard cords and the like.

A number of mechanisms have been developed for winding telephone cords on take up reels. Early embodiments of take-up reels have been disclosed in U.S. Pat. Nos. 452,799 and 1,455,715. More recently, take-up reels have been patented in U.S. Pat. Nos. 4,646,987 and 5,230,481.

A common characteristic of the aforementioned take-up reels for telephone cords is that they use dual reels which take up opposite ends of a telephone cord. Commonly, the midpoint of the telephone cord is secured between a pair of take-up reels having a common torsional spring drive and the opposite ends of the cord are wound about the two reels. While this technique has met with some commercial acceptance, it has the disadvantage that the reel mechanism is located at the midpoint of the cord which extends equally from each of the two reels. As the reel mechanisms are relatively bulky, the location of this mechanism at the midpoint of the extended cord causes difficulties. The relatively heavy mechanism at the center of the extended cord causes the cord to drag on the floor when the cord is extended, snagging furniture and other obstructions. Also, the weighted mass of the take-up reel mechanism is often sufficient, coupled with the tension loading on the extension cord, to dislodge the base unit of a telephone from a desk or telephone stand. The result is that the mid-cord take up reel is not an ideal solution to the problem.

OBJECTIVES OF THE INVENTION

It is an objective of this invention to provide a telephone cord winder which can be installed beside a telephone and remain at that location while the telephone cord is extended and retracted.

It is an additional objective of this invention to provide a telephone cord winder in which the telephone cord is wound on a single take-up reel.

It is also an objective of this invention to provide a telephone cord winder which employs a single take-up reel driven by a torsional spring drive.

It is a further objective of this invention to provide a telephone cord winder which includes a rotary connector.

It is likewise an objective of this invention to provide a telephone cord winder having a single cord reel which receives the entire length of a telephone cord driven by a torsional spring drive and includes a rotary connector received within a cord winder housing.

Other and related objectives will be apparent from the following description of the invention.

BRIEF STATEMENT OF THE INVENTION

This invention comprises a telephone cord winder having a single, torsional spring driven cord reel which is rotationally mounted within a cord winder housing. The extendible telephone cord is wound on the reel and electrically connected, through an internal rotary connector, to a stationary cord. Each of the extendible and stationary cords terminates in a modular phone plug adapted to be received in conventional modular phone sockets with multiple contacts, conventionally four or six contacts for phones.

BRIEF DESCRIPTION OF THE FIGURES

The invention will be described with reference to the FIGURES of which:

FIG. 4 is an elevational view of the cord winder of the invention with a housing half removed and with the rotary connector shown in sectional view;

FIGS. 5 and 6 are elevational views of the opposite housing halves of the cord winder of the invention;

FIG. 7 is an exploded plan view of the housing of the cord winder of the invention;

FIG. 8 is an exploded view of the rotary connector used in the cord winder of the invention;

FIGS. 9 and 10 are views of the opposite sides of the circuit board of the rotary connector;

FIG. 11 is a view along line 11—11' of FIG. 8;

FIG. 12 is a view along line 12—12' of FIG. 8;

FIG. 13 is an exploded view of the take-up reel;

FIG. 14 is a view along line 14—14 of FIG. 13; and

FIG. 15 is a view along line 15—15' of FIG. 13.

DESCRIPTION OF THE PREFERRED EMBODIMENT

Figure 1:
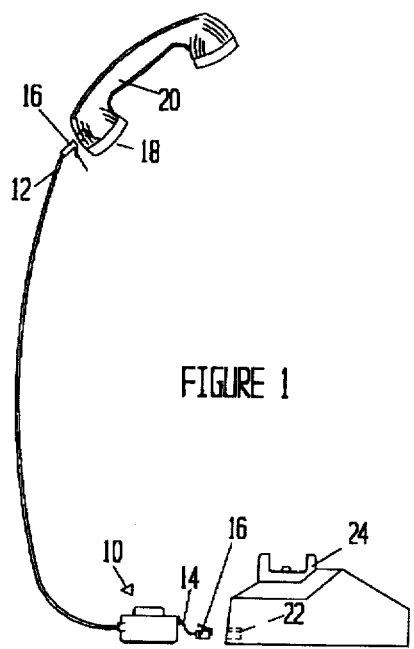
FIG. 1 illustrates the cord winder of the invention as installed in a conventional handset telephone.

FIG. 1 illustrates the cord winder 10 of the invention with an extendable phone cord 12 and a stationary cord 14. Each of the telephone cords has a terminal modular phone plug 16 adapted to be received in a conventional modular phone receptacle; the phone plug 16 on the terminal end of the extendable cord 12 is received in the receptacle 18 of the telephone handset 20 while the modular plug 16 on the terminal end of the stationary cord 14 is received in the receptacle 22 of an otherwise conventional phone base 24.

Figure 2:
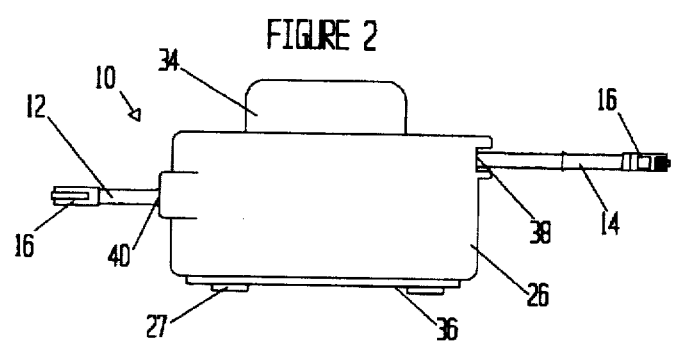
FIG. 2 is an elevational view of the cord winder of the invention.
Figure 3:
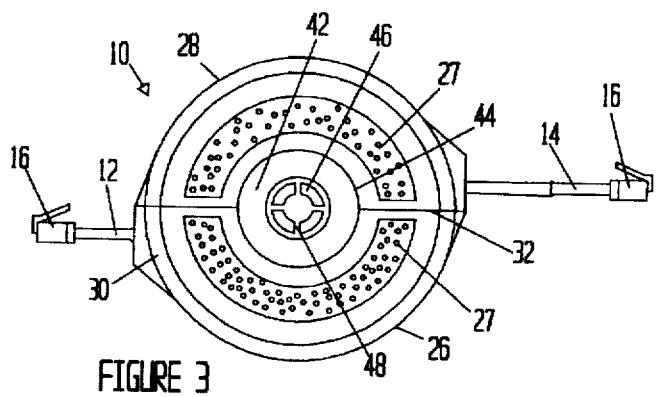
FIG. 3 is a view of the undersurface of the cord winder of the invention.

The housing 26 of the cord winder 10 is illustrated also in FIGS. 2 and 3 and comprises a generally right cylindrical housing formed of a pair of housing halves 28 and 30 secured together along joint line 32. The housing 26 has a cylindrical top protrusion 34 and a flat undersurface 36. The stationary cord 14 extends through a slot 38 adjacent the upper portion of the right cylindrical housing 26 while the extendable cord 12 extends through a slot 40 at approximately 180° angular increment from the stationary cord slot 38 and at approximately the mid-height of the cylindrical housing 26. If desired, the undersurface of the housing 26 can be secured to a supporting surface, such as a desk or table top, or a wall, by various means, such as an annular band 27 of adhesive Velcro tape. Referring to FIG. 3, the hub 42 of the torsion spring drive mechanism is received in a central aperture 44 of the housing 26, preferably flush with the undersurface 36 of the housing 26 and can include a recess 46 having a plurality of radial ribs 48 to permit manual rotation of the spring drive, thereby winding the spring and increasing the tension of the internal torsion spring.

Referring now to FIGS. 4 through 6, the housing 26 of the cord winder 10 is formed of opposite halves 28 and 30 which are permanently secured together. For this purpose, the housing halves have interlocking tongue and groove joints such as the groove 50 in the top surface of the top protrusion 34 of housing half 28 which receives a mating tongue 52 (see FIG. 5) from the opposite housing half 30. Similar tongues 56 and grooves 54 are shown in the annular top surface 58 of the housing 26 and in the cylindrical side wall 60 of the housing 26.

The housing 26 has an internal partition 62 which also has interlocking tongues 64 and grooves 66 between the housing halves. The partition 62 has a central through bore 68 to provide a bearing support for the take-up reel of the cord winder, as described with reference to FIG. 4.

The internal top wall 70 of the top protrusion 34 includes a spring clip 72 to support the received end of the stationary cord and a plurality of ribs 74 and 75 which are useful in immobilizing the stationary plug of the rotary connector as described hereinafter.

The lower portion 76 of the cylindrical housing 26 beneath the internal partition 62 has opposite axial indentations 80 and 82 formed by slightly offsetting the internal cylindrical sidewalls 78 and 84. As previously described with reference to FIG. 3, the bottom wall 86 of the cylindrical housing has a central aperture 44 which receives the hub 42 of the spring drive mechanism.

Referring now to FIG. 7, the cord winder 10 of the invention is shown with the housing half 28 removed and with the case of the rotary connector 88 shown in sectional view. As there illustrated, the torsion spring drive mechanism 90 has a hub 42 which is received in the central aperture 44 in the bottom wall 86 of the housing 26 and which is integral with a flat circular disk 92 that has a plurality (four) of spring arms 94, each distally supporting an axial foot 96, in a manner described in greater detail with reference to FIGS. 14 and 15.

The winder cord reel 98 depends from a flat circular disc 92 and has a shaft which extends through the through bore 68 of the partition 62 and into engagement with the end of the torsion spring, as described hereinafter with regard to FIG. 13. The central hub 102 of the reel 98 receives coils of the extendable phone cord 12. The extendable cord 12 is a thin, flat cord of multiple conductors, preferably 4, which has its received end 104 extending through a slot 106 in the disk 92 of the cord reel 98. The case 122 of the rotary connector 88 is indexed to the winder cord reel 98 with a square boss 180 on wheel 92 which fits into a square recess 182 on the undersurface of the connector case 118; see also FIGS. 11 and 13. The end 108 of the extendible phone cord 12 extends through a slot 38 in the side wall of the housing 26 and distally supports a modular phone plug 16 having a conventional array of multiple contacts 110 as illustrated in FIG. 4. Preferably, the cord also supports a plastic sheath 112 which is integral with the modular plug 16 and which has a distal flange 114 that abuts against the slot 38, limiting retraction of the cord 12.

The received end 104 of the extendable cord 12 is passed through a slot 116 in the cylindrical case 118 of the rotary connector 88. A plurality (four) of contact leaves 120 are mounted in the base 122 of the rotary connector case 118 to make contact with respective conductors of the received end 104 of the extendable cord 12. Each of the contact leaves 120 is in resilient electrical and physical contact with conductor tracks on the undersurface of a circuit board 124, as described in greater detail with reference to FIGS. 8–10.

The contacts on the upper surface of the circuit boards are in electrical connection to a second set of contact leaves 126 each of which has a blade end 128 that is pressed into contact with a respective conductor of the multiple conductor stationary cord 14. The stationary cord 14 has a terminally supported modular phone plug 16, preferably with a short sheath 112 to strengthen the cord end. The received end 130 of the stationary cord 14 is received through a slot 40 in the sidewall of the housing 26 and extends into the top protrusion 34, secured by the spring clip 72 on the undersurface of the top wall of the protrusion 34 and into the stationary plug 132 of the rotary connector 88.

The stationary plug 132 of the rotary connector 88 has a square boss 134 which is received between the ribs 74 and is rotationally restrained by the ribs 74 on the undersurface of the internal wall of the protrusion 34. This construction permits assembly of the rotary connector 88 as a separate module which can be tested for quality control apart from the final assembly. The rotary connector 88 is not rigidly secured to the housing case 26 or to the winder cord reel 98, but instead floats in the assembly, thereby permitting some latitude for axial displacement or tilting of the connector 88 in the final assembly. For this purpose, the joint between the square boss 184 with the recess 182 of the case 118 (see Figure B) and the joint between the square boss 134 of the stationary plug 132 of the connector 88 with the ribs 74 on the undersurface of protrusion 34 of the case 26 are loose, i.e., not press fit, to permit slight movements of the rotary connector, while preventing relative rotational movement of the joined parts.

The details and construction of the rotary connector 88 of the invention will be described in greater detail with reference to FIGS. 8 through 12. The rotary connector 88 is shown in exploded view in FIG. 8 and comprises a cylindrical case 118 having a slot 116 in its base 122 to receive the end 104 of the extendable cord 12. The case 118 has a bottom wall 136; see FIG. 12, which has a plurality of slots 138, one for each of the conductors of the multiple conductor cord 12 and each of these slots receives a contact leaf 120, shown in FIG. 8. The contact leaf 120 has a base leg 140 and an arm 142 which bears a serrated blade 144 that punctures the insulation of the received end 104 of the extendable cord 12 to make contact with a respective conductor of that cord. The bottom wall 136 of the rotary connector case 118 also has a plurality of cylindrical recesses 146, one each for each of the contact leaves 120 and a helical coil spring is received in each of the cylindrical recesses 146 to serve as a resilient spring wiper 148; see FIG. 8. The spring wipers 148 seat with one end against the leg 140 of the contact leaf 120 and their opposite end bearing against a respective conductor track 150, 152, 154 and 156 (see FIG. 9) on the undersurface of the circuit board 124. The recesses 46 bores are arrayed in a pattern of different diameters so as to locate each of the resilient spring wipers 148 on a separate circular conductor track on the undersurface of the circuit board 124.

The upper surface of the circuit board 124 is shown in FIG. 10 and has a plurality of parallel elongated contacts 160, 162, 164 and 166, each of which is in electrical connection to a respective circular conductor track by through vias in the circuit board. The circuit board 124 has several peripherally located axial prongs 158 which are received in slots (not shown) in the stationary plug 132 of the rotary connector 88, serving to orient the angular position of the circuit board in the assembly.

The stationary plug 132 of the rotary connector 88 is generally cylindrical and has an internal cavity 168 to receive the circuit board 124. The plug 132 also has a plurality of elongated slots 137 similar to the slots 138, shown in FIG. 12, each of which receives a respective spring arm contact leaf 126. The spring arm contact leaves have a blade end 128 with a serrated edge that punctures the insulation of the received end 130 of the stationary cord 14 which passes through slot 172 in the boss 174 on the upper surface of the stationary plug 132. The spring arm contact leaves 126 also have a leaf spring contact 176 having an end terminal 178 which is resiliently received against a respective one of the parallel contacts 160-166 on the upper surface of the circuit board 124.

The upper surface of the boss 174 of the stationary plug 132 has a detent boss 134 which is preferably square and is engaged by the ribs 74 on the undersurface of the internal wall of the protrusion 34 of the housing half 28, in the manner previously described with reference to FIG. 7.

The stationary plug 132 is received within the cylindrical cavity of the rotary connector case 118 and is permanently seated therein with a retaining washer 119 and a frictional surface bearing washer 121. The retaining washer 119 can be permanently bonded to the case 118 by adhesive or solvent welding, or can be snapped into a tight fit with the case 118.

Referring now to FIG. 11, the undersurface of the case 118 of the rotary connector 88 has a rectangular, preferably square, rib 180 surrounding a central square recess 182. As illustrated in FIG. 13, the rotary connector 88 is shown with the square recess 182 receiving a square boss 184 on the surface of the disk 92 of the cord reel 98. The reel is supported by shaft 100 which is received through the central aperture 68 of the internal partition 62, previously described, and into a central cylindrical recess 192 (see FIG. 15) in the spring mechanism drive mechanism 90.

Nested within the cylindrical cavity of the drive wheel is a torsional spring 190 which has one end 194 permanently received in a retention slot 196 in a side wall 198 of the disk 200 and its opposite end having a bent return 202 which is received in the slot 186 of the shaft 100 of the take-up cord reel 98 (see FIGS. 13 and 15).

As previously mentioned, the drive wheel of the torsion spring mechanism has a plurality of resilient, arcuate arms 94 which are integrally formed with the flat disk 200 of the wheel. Each arm 94 has a base wall 201 integral with the disk and a dependent radial leg 204. Each arm has a terminal axial foot 96 with a beveled leading edge 206 and a sharp trailing edge 207 which functions with the axial slots on the internal side wall of the torsion drive cavity of the housing previously described with reference to FIGS. 5 and 6 to form a unidirectional clutch mechanism permitting rotation in the direction indicated by the arrowhead line 210 while preventing opposite rotation.

The operation and functioning of the cord winder mechanism of the invention should be relatively apparent from the preceding description of its construction. The torsional spring drive permits the cord that is wrapped about the take-up reel to be extended against the resilient bias of the torsion spring so that when the tension on the extendable cord is released the torsion spring will retract the cord and wind it about the central hub of the take-up reel. As the take-up reel rotates with extension or retraction of the extendable cord, the case of the rotary connector is similarly rotated by the square drive interlock of the take-up reel and case. Electrical connection is maintained between the stationary and extendable cords through the rapid contact leaves and the spring wiper contacts which are received in the case of the rotary connector, to the circular tracks of the circuit board, through the circuit board to the parallel array of conductors and the spring arm contact leaves which are mounted in the stationary plug of the rotary connector and which are in contact with respective conductors of the stationary cord. In this fashion, the extendable cord can be received about a single take-up reel so that its entire length is extendable in a single direction from the take-up reel, thereby permitting extension of the extendable cord without movement of the cord winder housing. The cord winder housing can thus be permanently installed at a suitable location, preferably immediately adjacent the phone. Since the cord winder housing is permanently stationary it can be permanently secured to a supporting structure such as a desk top, phone base, or wall so that all of the tension applied to the cord is carried by the supporting surface to which the housing of the cord winder is attached thereby preventing accidental dislodgement of the phone. Additionally, the cord winder housing thus does not drag about the floor of the office or home thus providing a greater freedom to the user.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a telephone cord winder including a cord reel rotationally mounted in a winder housing and biased by a torsional spring drive, the improvement comprising:

a first end of a first multiple conductor cord, having a plurality of first conductors, terminally connected to a first modular phone plug;

a first end of a second multiple conductor cord, having a plurality of second conductors, terminally connected to a second modular phone plug;

said phone plugs adapted for insertion into modular phone receptacles of a base and a handset of a telephone, said first multiple conductor cord having a second end, opposite its first end, received within said winder housing and wrapped about said cord reel, a rotary connector received within said winder housing, said rotary connector including:
  (a) a connector case mounted for rotational movement relative to said winder housing and rotationally indexed to said cord reel, said connector case including:
    (1) a first plurality of connector blades, each being in electrical connection to a respective one of said first conductors at said second end of said first multiple conductor cord, and
    (2) a plurality of wiper arms, each being in electrical connection to a respective one of said first plurality of connector blades; and
  (b) a rotary connector plug indexed to said winder housing and received within said connector case, said rotary connector plug allowing said connector case to freely rotate thereabout, said rotary connector plug including:
    (1) a plurality of conductor tracks, each being in sliding electrical contact with a respective one of said plurality of wiper arms,
    (2) a plurality of contacts, each being in electrical connection with a respective one of the plurality of conductor tracks, and
    (3) a second plurality of connector blades, each being in electrical connection with a respective one of the plurality of contacts, and each also being in electrical connection to a respective one of said second conductors at a second end of said second multiple conductor cord opposite said first end of said second multiple conductor cord.

2. The telephone cord winder of claim 1 wherein said plurality of wiper arms are resilient springs.

3. The telephone cord winder of claim 1 wherein said connector case is rotationally indexed to said cord reel by a joint permitting axial displacement of said connector case relative to said cord reel.

4. The telephone cord winder of claim 3 wherein said connector case has a central square recess which loosely receives a square boss of said cord reel.

5. The telephone cord winder of claim 1 wherein said rotary connector plug is rotationally indexed to said winder housing by a joint permitting axial displacement of said rotary connector plug relative to said winder housing.

6. The telephone cord winder of claim 5 wherein rotary connector plug has a square boss which is loosely received between ribs on an inside wall surface of said winder housing.

7. The telephone cord winder of claim 1 wherein said conductor tracks are circular and disposed on one side of a flat circuit board and said contacts are disposed on the opposite side of said circuit board and including through connectors interconnecting one each of said contact to a respective one of said conductor tracks.

8. The telephone cord winder of claim 7 wherein said connector case is a cylindrical case is cylindrical case which is rotationally received about said rotary connector plug and said flat circuit board is fixedly secured in said connector plug.

9. The telephone winder of claim 8 wherein said rotary connector is a modular sub-assembly.

10. The telephone cord winder of claim 1 wherein said cord reel includes a shaft, a drum mounted on the shaft, and a circular flange attached to the drum.

11. The telephone cord winder of claim 10 wherein said circular flange includes a through slot, and said second cord end of said first multiple conductor cord is fastened to said drum and extends through said slot and into the rotary connector.

12. The telephone cord winder of claim 10 wherein said torsional spring drive includes a torsional helical spring with one end fixedly secured to said winder housing and another end secured to said drum to apply a torsional bias to said drum.

* * * * *